May 21, 1929.  E. F. WESTON  1,714,065
ELECTRICAL INDICATING INSTRUMENT
Filed Sept. 16, 1927  2 Sheets-Sheet 1

Inventor:
Edward F. Weston,
By Byrnes Townsend
& Brickenstein,
Attorneys

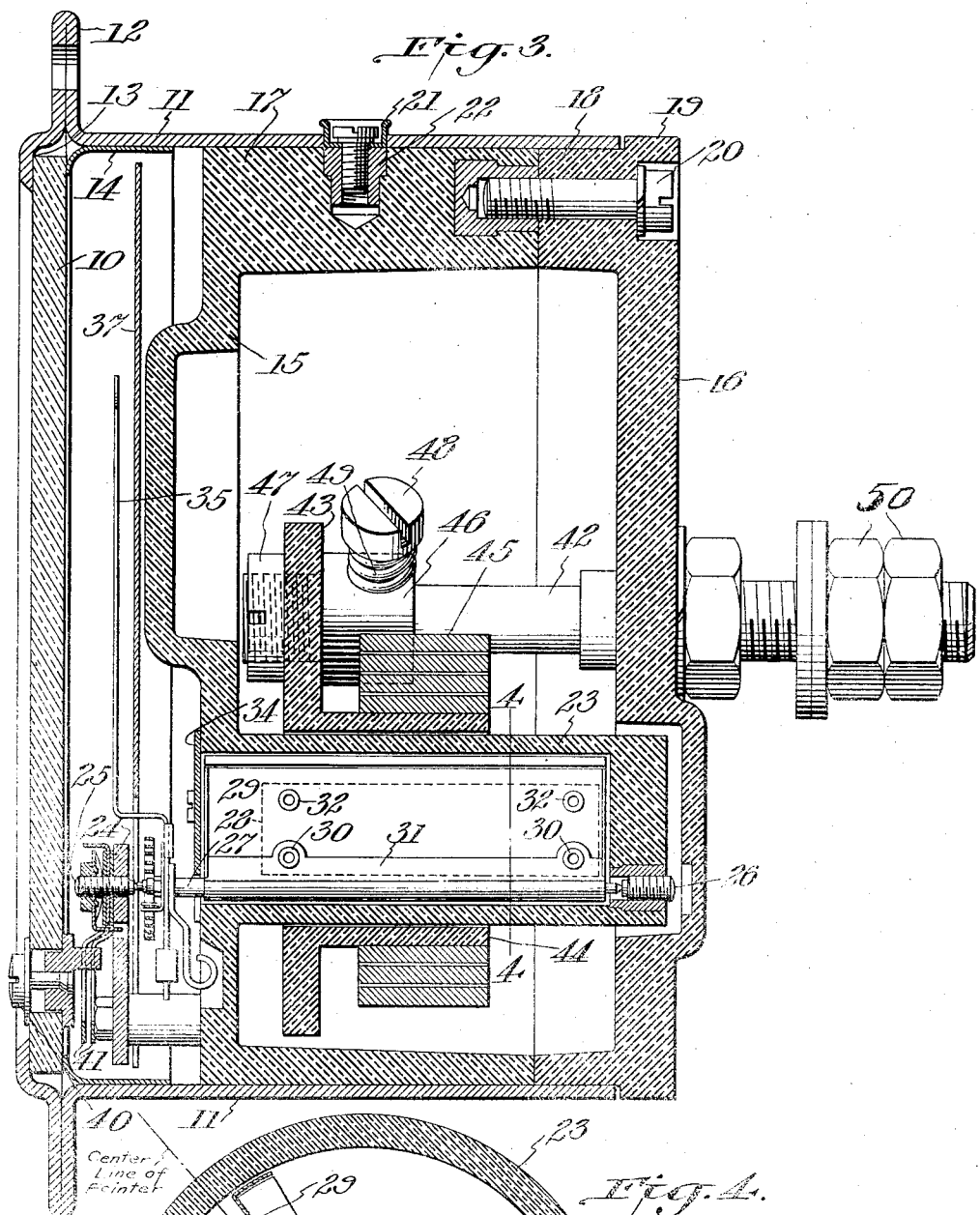
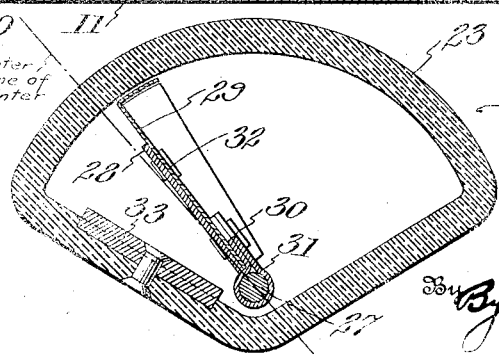

Patented May 21, 1929.

1,714,065

UNITED STATES PATENT OFFICE.

EDWARD F. WESTON, OF NEWARK, NEW JERSEY, ASSIGNOR TO WESTON ELECTRICAL INSTRUMENT CORPORATION, OF NEWARK, NEW JERSEY, A CORPORATION OF NEW JERSEY.

ELECTRICAL INDICATING INSTRUMENT.

Application filed September 16, 1927. Serial No. 220,031.

This invention relates to improvements in electrical indicating instruments, and more particularly to ammeters embodying structural features which are described and broadly claimed in my copending application, Serial No. 217,851, filed September 6, 1927.

An object of the present invention is to provide an ammeter of simple and economical construction, and which functions with the accuracy and reliability of larger, more-complex and more expensive instruments. A further object is to provide an ammeter of the iron vane type in which the winding may be moved longitudinally of the vane to adjust the instrument.

These and other objects of the invention will be apparent from the following specification when taken with the accompanying drawings, in which, Fig. 1 is a front elevation of an instrument embodying the invention;

Fig. 3 is a central vertical section through the instrument, and

Fig. 4 is a vertical section through the vanes, damper and air chamber, as viewed on line 4—4 of Fig. 3.

Figure 1:
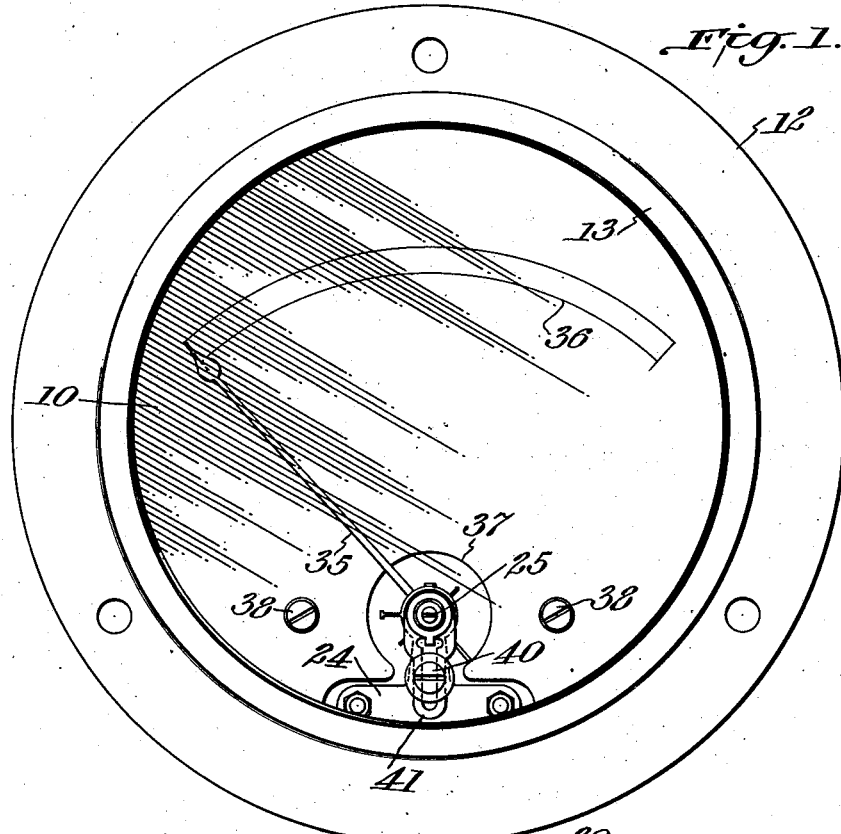
Figure 2:
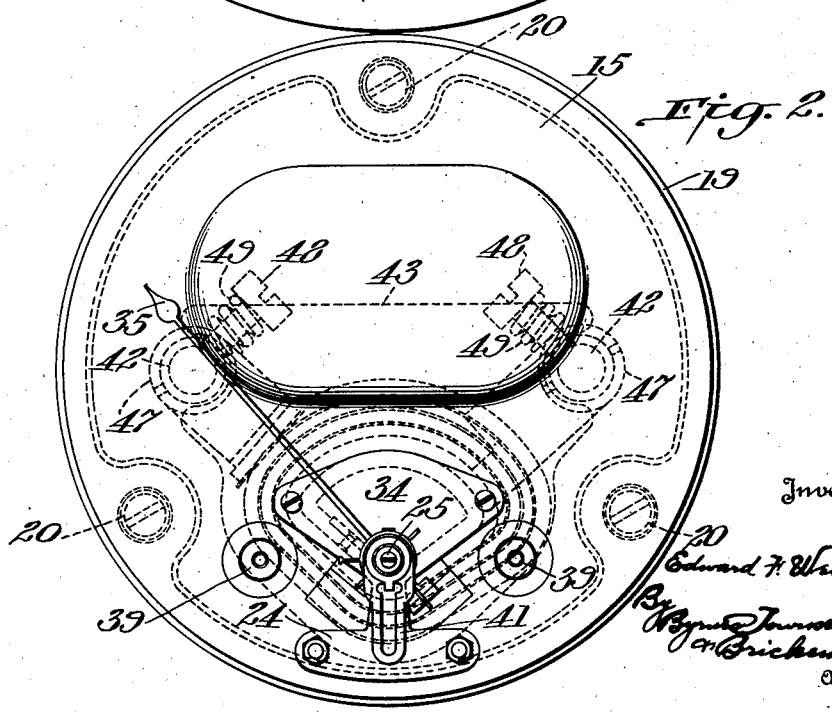
Fig. 2 is a front elevation of the instrument as viewed with the casing and scale plate removed.

The particular instrument illustrated in the drawings is an ammeter of the iron vane type, the instrument casing being adapted for mounting in an aperture in a panel.

In the drawings the numeral 10 indicates the glass cover or front wall of the instrument casing, the side walls 11 preferably taking the form of a sheet metal cylinder which is expanded adjacent the forward end to form the mounting flange 12, and then turned inwardly at 13 for cooperation with ring 14 to retain the glass cover 10.

With the exception of the adjusting screw of the zero corrector, all of the instrument parts form an assembly which may be removed as a unit from the casing. The moving system is carried by a front base member 15 and the winding is supported by the rear base member 16. The terms "front" and "rear" indicate the relative positions of the parts when the instrument is so positioned that Fig. 3 represents a vertical section through the same but it is to be understood that these terms are used in the specification and claims only for convenience of description as the construction may be embodied in instruments in which the axis of the movable system is not arranged horizontally.

The front base member 15 is provided with a peripheral flange 17 which preferably extends into close engagement with the peripheral flange 18 of the rear base member 16. The peripheral surfaces of flanges 17 and 18 are so shaped that they fit snugly within the side wall 11 of the instrument casing, and the edge 19 of rear base member 16 preferably extends over the rear edge of the side wall 11. The two base members are held in assembled position to form a closed housing by means of bolts and threaded inserts 20, and the housing is fixed within the casing by a bolt and flanged washer 21, the bolt passing into the threaded insert 22 of the front base member 15.

The base member 15 is provided with rearwardly offset portions forming the chamber 23 which, as shown in Fig. 4, is of substantially sector shape in cross section. The bridge 24 is carried by the base member 15 and supports a bearing 25 in alignment with the bearing 26 which is mounted in the rear wall of chamber 23, the two bearings being located on the axis of the sector shaped chamber. The shaft 27 which is mounted on the bearings carries the iron vane 28 and also the damper 29, these parts being secured to each other and to the shaft by rivets 30 or other means which pass through the vane and damper, and through an elongated strap 31 which is tightly wrapped about the shaft. Other rivets 32 are passed through the vane and damper near the outer edge of the vane, and the damper is further reinforced by flanging its edges. The fixed iron vane 33 is secured to a radial wall of the chamber 23, and the forward end of the chamber is closed by a plate 34.

The construction permits the use of exceedingly thin sheet aluminum for the damper, and the moving system is therefore of light weight and small size. The invention is distinguished from prior devices in which the iron vane was employed as the damper by the fact that the iron vane may be made of a size and shape determined solely by the electrical requirements of the system.

A pointer 35 is fixed to the shaft 27 and moves over the scale 36 on a scale plate 37 which is secured by screws 38 to bosses 39 on the base member 15. The adjusting element 40 of a zero corrector is mounted in the glass cover 10 and engages within the slotted extensions 41 of the front bearing when the casing is assembled on the housing. The zero corrector and front bearing are preferably of the type described in the patent to Grant Carpenter, No. 1,661,214, issued March 6, 1928, but the specific constructions of these elements do not constitute a part of the present invention.

The rear base member 16 serves as a closure for the instrument casing and is provided with terminal posts 42 which carry nuts 50 for clamping conductor wires or straps to the instrument. The portions of posts 42 which project into the housing are parallel to each other and terminate adjacent the front base member 15. An insulating plate 43 of generally triangular shape in front elevation is slidably mounted on the posts 42, and is provided with an opening of sector shape which permits it to clear the chamber 23. The flange 44 projects rearwardly from the edge of the opening and provides a seat for the winding 45 which is sector shaped in cross section. The particular instrument which is illustrated in the drawings is of relatively high range and the winding 45 therefore takes the form of a few turns of strap copper of high current carrying capacity. The particular winding which is mounted on the insulating plate will, of course, be determined by the desired range of current for which the instrument is to be designed.

Contact sleeves 46 are slidably mounted on the respective terminal posts 42 and are connected to the ends of winding 45. The contacts are enlarged at their rear ends and are secured to the edges of the insulating plate 43 by nuts 47 which are threaded upon the forward ends of the sleeves. Bolts 48 pass through the contact sleeves for fixing the latter to the posts 42, the bolts being preferably provided with spring lock washers 49.

The adjustable mounting of the winding 45 upon the terminal posts 42 is an important feature of the invention, as the initial adjustment or calibration of the instrument may be effected by moving the winding longitudinally of the iron vane 28.

It is to be noted that the winding is completely enclosed by the housing formed by the two base members and that the flange 17 of the front base member provides a tight seal between the housing and the space adjacent the glass cover 10. This feature is of considerable practical importance as varying humidity and temperature changes due to the heating effect of current passed through an insrument winding frequently result in a deposition of moisture upon the inner surface of the glass, thus rendering accurate readings difficult or impossible. In the present construction, the contacting surfaces of the flanges 17, 18 and the contacting surfaces of the casing walls 11 and flange 17 are substantially air-tight so far as pressure differences due to the heating effect of the winding is concerned. Under greater differences of pressure such as could be obtained with a vacuum pump or compressor, the joints would doubtless permit leakage, and the term "substantially hermetic seal" is therefore employed in the following claims as indicating a joint between two parts of the instrument which prevents air or vapor passing from one to the other under differences of pressure which arise in the usual use of the instrument.

As shown, the base members 15 and 16 are of insulating material, preferably molded into the shapes shown.

In my copending application, Serial No. 217,851, filed September 6, 1927, I have illustrated and described a voltmeter which, so far as the general construction of the casing, double base members and moving system is concerned, is substantially identical with the construction described above, since these structural features may be embodied in electrical indicating instruments of different types by an appropriate design of the windings which are associated with the moving system. No claim is made herein to electrical indicating instruments employing the double base construction for carrying the moving system and the winding or windings, nor to the combined vane and damper construction as these features are broadly claimed in my copending application.

It will be understood that various changes may be made in the several parts, their relative size, shape and location without departure from the spirit of my invention as set forth in the following claims.

I claim:

1. In an ammeter of the iron vane type, a movable system including an iron vane, a winding for establishing, when traversed by the current which is to be measured, the magnetic field which actuates said vane to displace said movable system in accordance with the magnitude of the said current, and means for effecting an adjustment of the ammeter for calibration of the same, said means including a support upon which said winding is mounted for movement axially of said vane.

2. In an ammeter of the iron vane type, a casing, a movable system within said casing and including an iron vane, a winding for establishing the magnetic field which effects displacement of said moving system in accordance with the magnitude of the current traversing said winding, a rear closure for said casing, and means carried by said closure and supporting said winding for movement thereof axially of said vane.

3. The invention as set forth in claim 2, wherein said means comprises a pair of terminal posts extending through said closure, and a plate of insulating material slidable along said posts, said winding being secured to said insulating plate.

4. In an ammeter of the iron vane type, a front and a rear base member, said front base member having portions which are offset rearwardly to provide a chamber of sector shape in cross section, a fixed and a pivotally supported iron vane carried by the walls of said chamber, a winding having a central passage therethrough of sector shape and of such size as to be slidable over said chamber, means on said rear base member supporting said winding for adjustment axially of said chamber, and means for securing said winding to said supporting means in the desired position of axial adjustment.

5. In an electrical measuring instrument of the iron vane type, a substantially air tight housing comprising a front and rear base member, a portion of the transverse wall of said front base member being offset rearwardly to provide a chamber of sector shape in cross section, a bridge carried by said front base member and having a pivot arranged on the axis of said chamber, a second pivot mounted on the rear wall of and coaxial with said chamber, a shaft on said pivots, an iron vane on said shaft, terminal posts extending through the transverse wall of said rear base member, a plate slidable along said terminal posts and apertured to clear said chamber, a winding supported by said plate and having the ends thereof in contact with the respective terminal posts, and means for fixing said plate to said posts in any desired position of adjustment along the same.

In testimony whereof, I affix my signature.

EDWARD F. WESTON.